United States Patent [19]

Kuzevanov

[11] Patent Number: 5,601,508
[45] Date of Patent: Feb. 11, 1997

[54] BEVEL GEAR DIFFERENTIAL LOCK

[76] Inventor: Viktor M. Kuzevanov, ul.Krasnoznamennaya, d. 16, kv. 32, 454106 Chelyabinsk, Russian Federation

[21] Appl. No.: 406,964
[22] PCT Filed: Dec. 15, 1993
[86] PCT No.: PCT/RU93/00304
 § 371 Date: Mar. 27, 1995
 § 102(e) Date: Mar. 27, 1995
[87] PCT Pub. No.: WO94/24459
 PCT Pub. Date: Oct. 27, 1994

[30] Foreign Application Priority Data

Feb. 2, 1993 [RU] Russian Federation ............. 93006039
Feb. 2, 1993 [RU] Russian Federation ............. 93006205

[51] Int. Cl.⁶ .......................... F16H 48/06; F16H 48/20; F16H 48/26
[52] U.S. Cl. ............................ 475/231; 475/84; 475/89; 475/90
[58] Field of Search ................... 475/84, 89, 90, 475/91, 230, 231, 236, 237

[56] References Cited

U.S. PATENT DOCUMENTS

| | | | |
|---|---|---|---|
| 1,479,752 | 1/1924 | Smith | 475/89 |
| 2,495,016 | 1/1950 | Mesick | 475/231 X |
| 2,722,140 | 11/1955 | Cabell | 475/89 |
| 2,737,063 | 3/1956 | Thomas | 475/89 |
| 2,817,251 | 11/1957 | Stamm | 475/231 |
| 3,049,943 | 8/1962 | Frentzel | 475/90 |
| 3,145,583 | 8/1964 | Frentzel | 475/90 |
| 5,125,876 | 6/1992 | Hirota | 475/84 X |

FOREIGN PATENT DOCUMENTS 405118394 5/1993 Japan ....................... 475/89

*Primary Examiner*—Khoi O. Ta
*Attorney, Agent, or Firm*—Collard & Roe, P.C.

[57] ABSTRACT

A locking device for a bevel gear differential having an insert (5) mounted on its own axis (4) which is also the axis of the planet bevel (3). The insert is situated between the opposing bevel gears (2) and has teeth (6) which engages with those of the bevel wheels and when the bevel wheels are displace relative to each other, the insert executes reciprocal motion along the axis of the pinion. Various ways of creating resistance in the motion of the insert is disclosed which limits the relative angular velocity of the bevel wheels as they rotate.

6 Claims, 7 Drawing Sheets

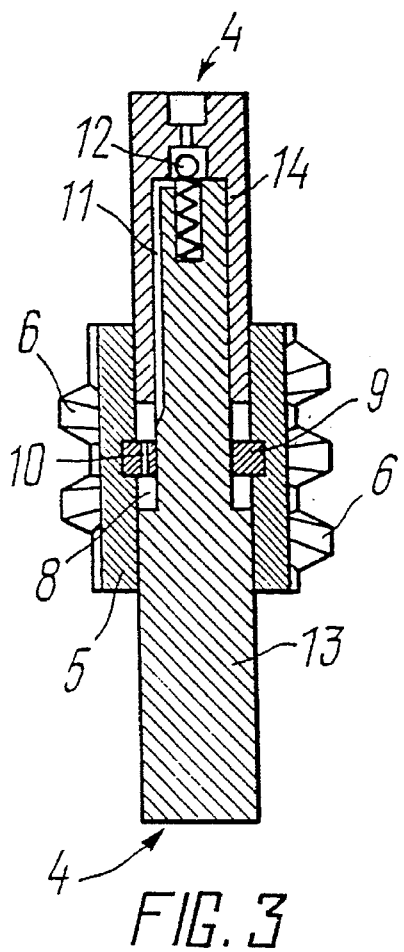
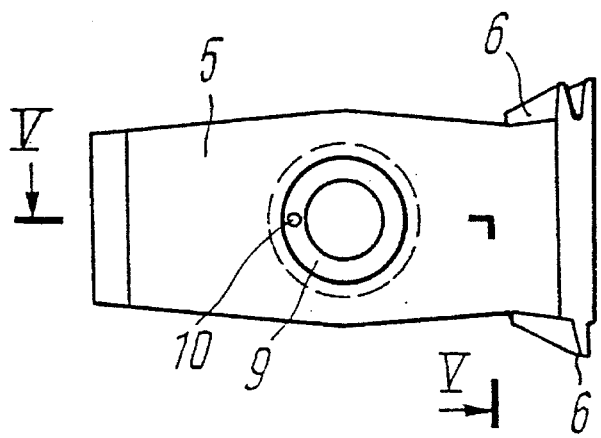
FIG. 4
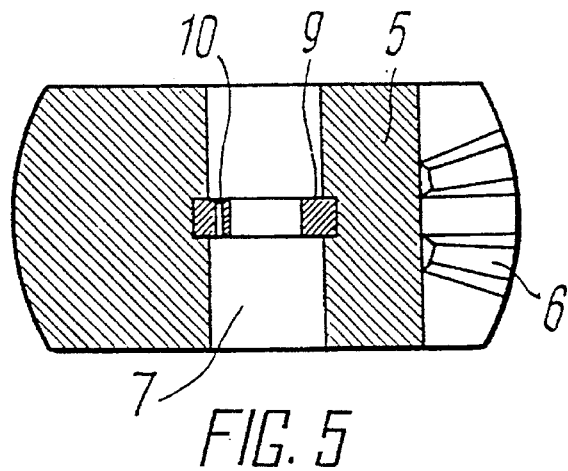
FIG. 5
FIG. 3

BEVEL GEAR DIFFERENTIAL LOCK

FIELD OF ART

The present invention relates to rotary gear transmissions and, more specifically, to bevel gear differential locks.

PRIOR ART

Known in the prior art is a bevel gear differential lock of motor vehicles (A. F. Andreyev et al. "Differentials of Wheeled Vehicles", 1987, "Mashinostroyeniye", Moscow, pp. 85–87). The differential comprises a housing accommodating two bevel gears meshing with each other via two differential pinions mounted on a common shaft, and a lock made integral with the differential housing in the form of a plunger pump disposed between the output shaft and the housing. The housing has radial holes in the form of a block of cylinders with plungers therein. A cam sprocket is mounted on the splines of the output shaft. The plungers are pressed against the cams by springs. A valve device in the plunger has a calibrated hole for the discharge of the compressed fluid. The block of cylinders has inlet holes with valves through which the fluid passes from the differential housing into the cylinder chambers. A special unit ensures a constant supply of fluid into the differential housing. During straight-ahead motion and at equal angular velocities of bevel gears the plunger pump is inoperative. As soon as the wheels start rotating at different angular speeds, the cams run one after another on the plungers which reciprocate and force the fluid through the calibrated holes. The high fluid pressure increases the resistance to rotation from the larger angular gear. The value of said resistance depends on the relative angular velocity of the gear.

The hydraulically-operated differential lock comprises a large set of parts and a number of high-precision access holes which complicates the design of the automotive differential and raises its cost. The worn cylinders of the plunger pumps in the differential housing are hard to repair. Therefore, the differential lock based on the hydraulic resistance principle has not become widely popular.

Also known is a mechanical lock for a bevel gear differential. (A. F. Andreyev et al, "Differentials of Wheeled Vehicles", "Mashinostroyeniye", Moscow pp. 51–54). This differential also comprises a housing with two bevel gears which interact via two differential pinions mounted on a common shaft and the lock proper is made integral with the differential housing and the bevel gears. The lock is made up of friction couplings, each consisting of a set of friction washers disposed between the bearing surfaces of the bevel gears and the housing. The surfaces of the bevel gear extensions and the side surface of the housing cage are provided, respectively, with splines and slots accommodating the friction washers. On changes in the traction forces on the output shafts, the set of the lock friction washers is compressed by the axial forces originated in the meshing teeth of the bevel gears and differential pinions. The increased forces of friction between the bevel gears and the housing lead to locking of the differential.

The above-described lock fails to ensure sufficient locking of the rotating output shafts because of rather weak axial forces occurring to the meshing bevel gears and pinions.

DISCLOSURE OF THE INVENTION

The main object of the present invention resides in providing a simple and reliable locking device inserted into the housing of a bevel gear differential without introducing any changes into its design.

This object is accomplished by providing a locking device for the bevel gear differential comprising a housing accommodating two counterposed bevel gears interacting with each other via at least one differential pinion wherein said device, according to the invention, is installed between the counterposed bevel gears on a shaft of its own which serves simultaneously as the pinion shaft and has the form of an insert provided with projections intended for interaction with the teeth of at least one of the two counterposed bevel gears at different angular velocities at which said insert executes reciprocating motion in the plane of the pinion shaft.

This ensures simplicity and reliability of the differential lock.

It is expedient that the insert should have at least two projections, one at either side, on at least one end of the insert.

This relieves the mating surfaces of the insert and the pinion shaft.

The insert may be provided with at least two projections, one at each end of the insert, on at least one of its sides.

This simplifies the manufacture of the projections.

It is desirable that the distance (L) from the space between the projections located at one side of the insert to the top of the projection located at its other side should correspond to the distance (H) between the tooth tops of the two counterposed gears of the bevel differential.

This provides for the progressive motion of the insert in full engagement wit the teeth of one of the counterposed gears.

It is practicable that the projections should have the form of teeth.

This will improve the wear resistance of the projections due to enlargement of the mating surfaces.

It is expedient that the insert should have a cylindrical hole coaxial with the pinion shaft, divided into two working chambers by a throttle ring, said chambers communicating with the fluid medium through at least one return valve and that the pinion shaft should have the form of a two-step rod whose smaller-diameter step should be provided with a slipped-on sleeve, said sleeve and the larger-diameter step of the rod serving as the pistons of the thus-produced hydraulic pump.

This enhances operational reliability and prevents leaks of fluid through mating surfaces.

In another embodiment of the differential lock the insert may have a cylindrical hole coaxial with the pinion shaft and provided inside with a two-directional thread for screwing-in two hollow bushings, each having an external thread and making, each, a screw pair with the corresponding thread of the cylindrical hole.

It is practicable that the own shaft of the pinion should have the form of a two-step pin whose smaller-diameter step should be provided with two slipped-on hollow bushings and a sleeve.

This provides for a more rational conversion of the translational motion into the rotary motion.

It is expedient that the hollow bushings should have axial motion limiters constituted by the end surface of the pin larger-diameter step and the end surface of the sleeve.

This relieves the load from the differential housing.

It is possible that the hollow bushings should have an axial-motion limiter constituted, for example, by the end surface of the pinion.

This permits increasing the coefficient of differential locking.

BRIEF DESCRIPTION OF THE DRAWINGS

Now the invention will be elucidated by a detailed description of its particular embodiments with reference to the appended drawings wherein:

FIG. 3 is one of the embodiments of the insert complete with the shaft (section in plane of pinion shaft), according to the invention;

FIG. 4—same embodiment of the insert (top view), according to the invention;

FIG. 5—same as in FIG. 4 (side view, section along Y—Y), according to the invention;

BEST MODE OF CARRYING OUT THE INVENTION

Figure 1:
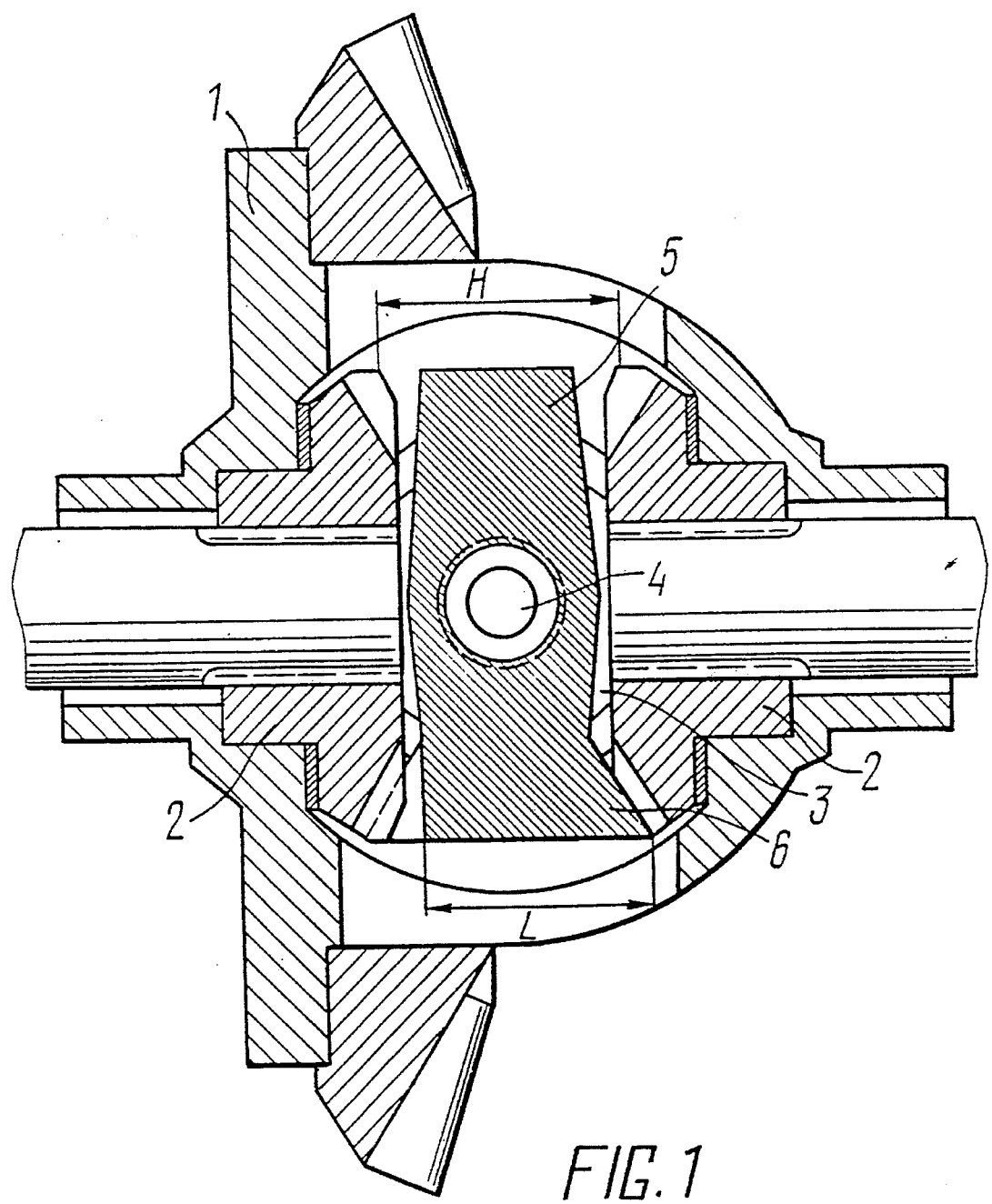
FIG. 1 illustrates the differential lock in the form of an insert in the bevel gear differential according to the invention (section in the plane of gear shaft perpendicular to the plane of the pinion shaft)
Figure 2:
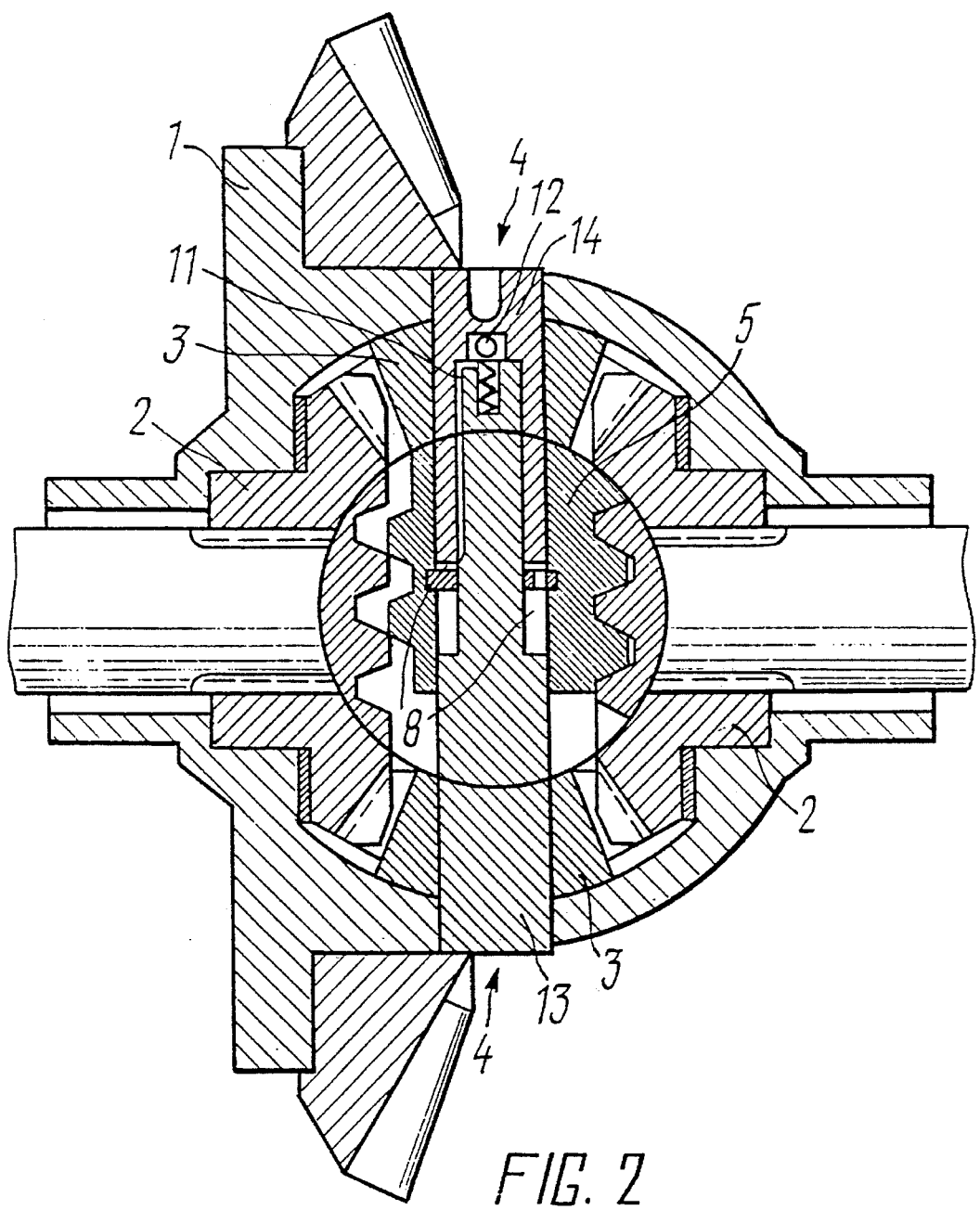
FIG. 2 is a general view of an embodiment of the locking bevel gear differential and its pinions (section through plane of gear and pinion shaft with a schematic view of gearing), according to the inventions.

The bevel gear differential comprises a housing 1 (FIGS. 1, 2) accommodating two counterposed bevel gears 2 interacting with each other via two pinions 3 (or, alternatively, one pinion). The claimed bevel gear differential lock comprises its own shaft 4 (FIGS. 2, 3) which serves simultaneously as the shaft of pinions 3 and carries an insert 5 mounted between the counterposed gears 2, one end of said insert having projections on two sides in the form of teeth 6 (FIGS. 3, 4, 5). In case of an even number of teeth of the pinion 3, the teeth 6 of the insert 5 are positioned on its opposite sides and are offset through half the tooth pitch of the gear 2. The distance L from the space between the teeth located on one side of the insert 5 to the tooth top on its other side corresponds to the distance H between the tooth tops of the two counterposed gears 2 of the bevel gear differential (L~H) (FIG. 1). The teeth 6 (FIGS. 3, 4, 5) of the insert 5 and the height of said insert in the plane of the pinion shaft 4 are made so as to ensure divergence of the tops of teeth 6 on one side of the insert 5 with the tooth tops of the counterposed bevel gear 2 during linear movement of the insert 5 along shaft 4 in case of full engagement of teeth 6 of the second side of the insert 5 with the teeth of the other bevel gear 2. The axial hole 7 (FIG. 5) of the insert 5 which is coaxial with the shaft of pinions 3 is made as a cylinder of a direct-acting hydraulic pump divided into two working chambers 8 by a throttle ring 9 (FIGS. 3–5). The throttle ring 9 has a calibrated hole 10. The working chambers 8 communicate with the fluid medium via a hydraulic drive 11 having ball check valve 12. The pinion shaft 4 may have the form of a two-step rod 13 (FIGS. 2–3) whose smaller-diameter step has a slipped-on sleeve 14. Said sleeve 14 and the larger-diameter step of the rod 13 function as pistons of the thus-produced hydraulic pump.

The insert 5 is installed into the housing of the bevel gear differential in the space between the counterposed meshing bevel gears 2 and is fixed by its own shaft 4. In the differential lock where the teeth 6 of the insert 5 are provided on its two sides and on two ends, said insert 5 may be of a dismountable construction for easier assembly.

Figure 6A:
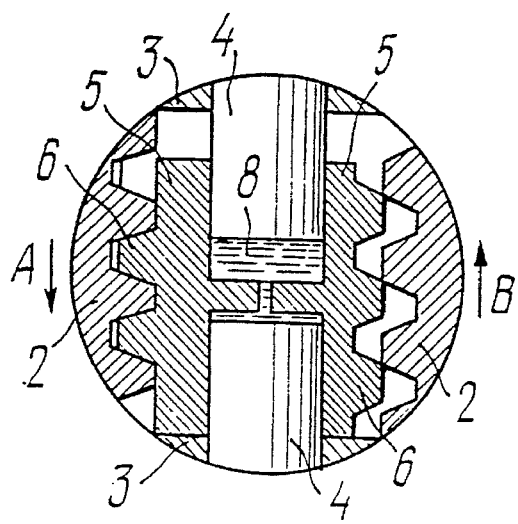
FIG. 6 (a, b, c, d) are schematic views of the insert in its various positions relative to bevel gears, according to the invention.
Figure 6B:
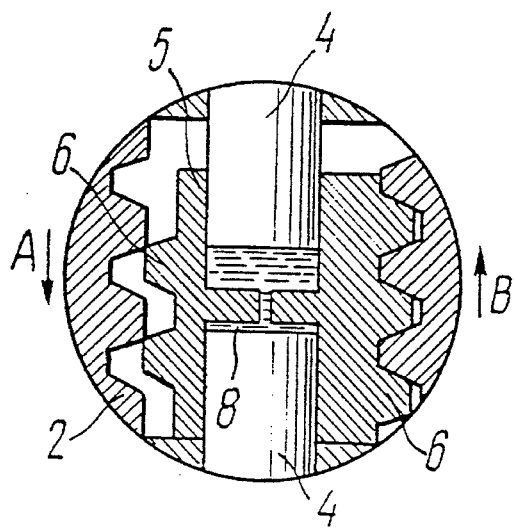
Figure 6C:
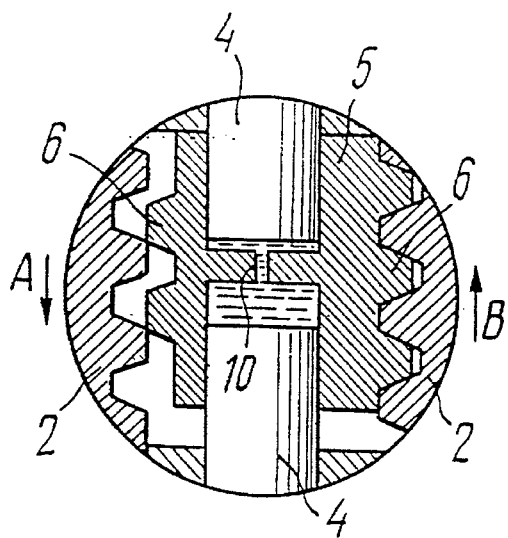
Figure 6D:
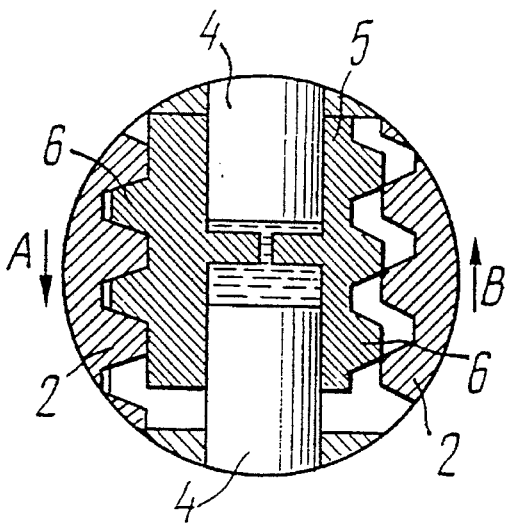

The hydraulically-operated lock functions as follows. At equal angular velocities of the bevel gears 2 the insert 5 stays immovable relative to the housing 1 and rotates jointly with the latter. At different angular velocities (in FIGS. 6a, b, c, d the direction of movement of bevel gears 2 is shown by arrows A, B) the insert 5 may occupy any position. For example, the insert 5 (FIG. 6a) meshes with the LH (in the diagram) bevel gear 2 after linear movement over the shaft 4 towards the circular motion of the teeth of this gear (FIG. 6, Arrow A) to the point of divergence of the tooth tops on the opposite side. The push-out axial forces in the gearing turn the insert 5 on the shaft 4 and put it in mesh with the counterposed gear 2 which rotates in the opposite direction relative to the first on (FIG. 6b, Arrow B). During linear motion on the immovable shaft 4 the insert 5 acting as a movable cylinder of the direct-acting pump, and the sleeve 14 function as displacing pistons and force the fluid from one chamber 8 into the other one (FIG. 6c). The working chambers 8 are filled with oil at all times because any losses are made up for by the return valve 12 which draws in oil through the hydraulic drive 11 during rarefaction in the chambers 8. The axial forces originated due to interaction of the tooth sides cannot bring the insert out of engagement since the teeth 6 on the opposite side of the insert 5 are positioned on the tooth tops of the counterposed gear 2. To demesh the insert 5, it must be moved linearly on the shaft 4 through a distance required for bringing the teeth 6 of the insert 5 to a position opposite the tooth spaces of this gear 2. This is possible only during further movement of the gears 2 shown in FIGS. 6a, b, c, d by arrows AB. After divergence of the tooth tops the insert 5 turns again on the shaft 4 and comes in engagement with the counterposed gear 2 (FIG. 6d).

Thus, the leading motion of one of the gears 2, the reciprocating motion of the insert 5 and the displacement of oil from one working chamber 8 into the other one through the calibrated hole 10 of the throttle ring 11 covert the mechanical energy into the energy of the flow. The velocity of oil flow through the calibrated hole 10 limits the speed of the linear motion of the insert 5 thereby limiting the velocity of the leading gear 2. At a relatively low angular velocity of the gears 2 the oil has enough time to be squeezed form one chamber 8 into the other one through the calibrated hole 10.

Figure 7:
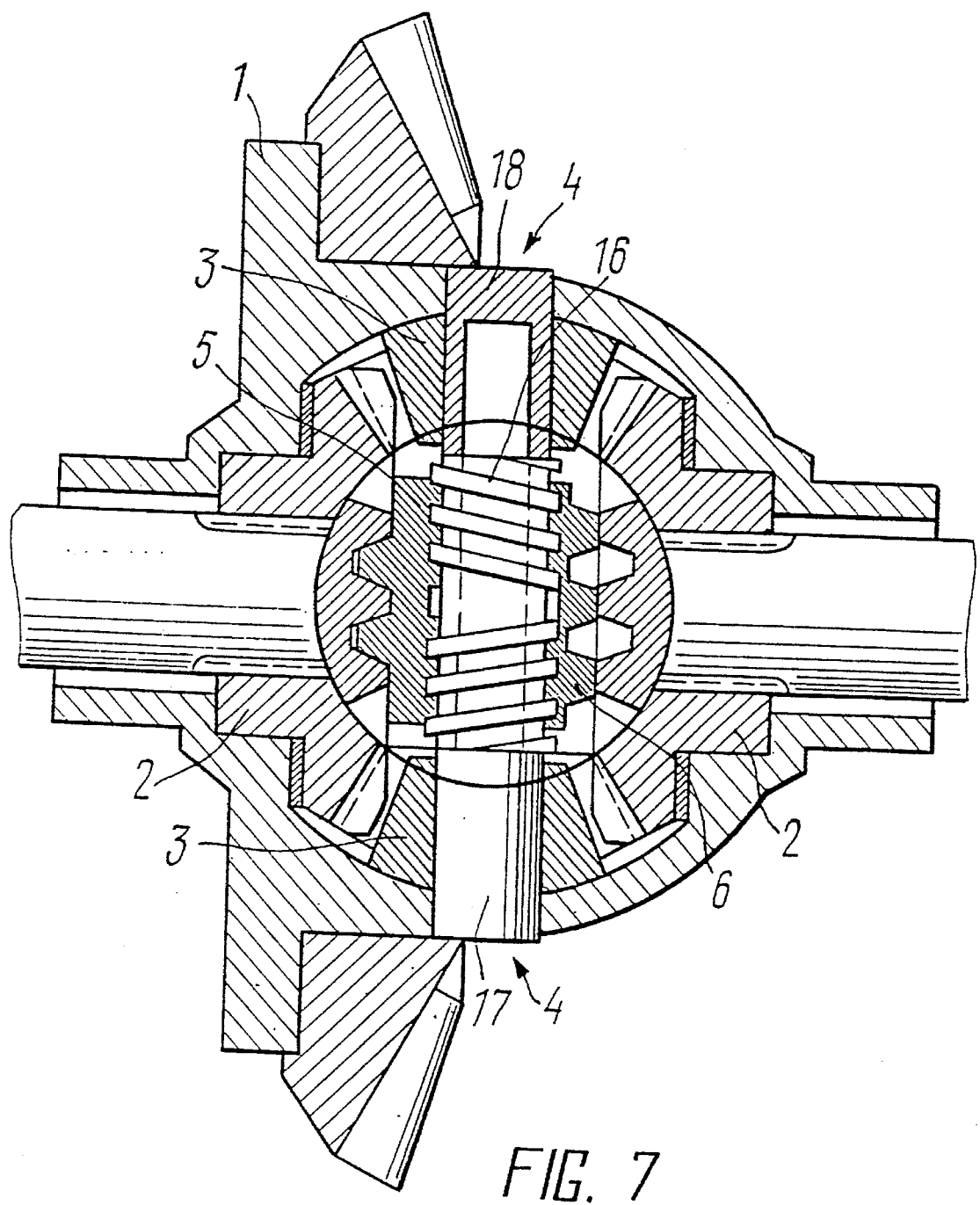
FIG. 7 is a general view of another embodiment of the bevel gear differential lock (section in plane of gears and pinion shaft with a schematic view of gearing), according to the invention.
Figure 8:
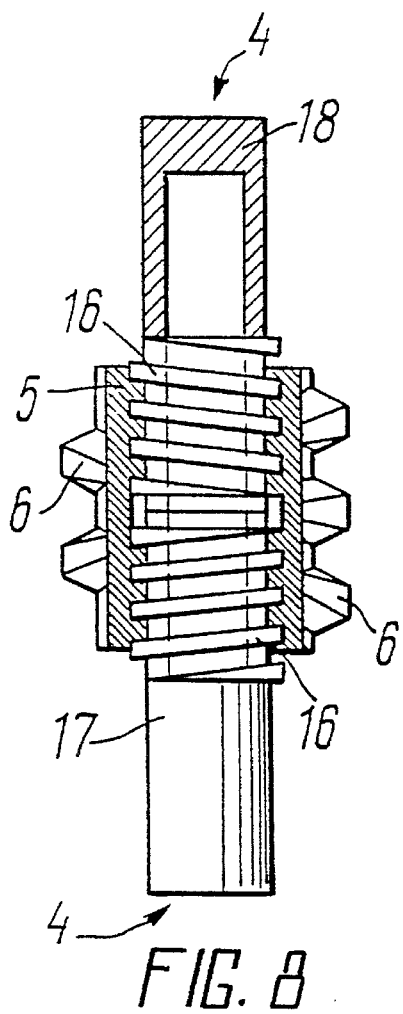
FIG. 8 is the same version of the insert complete with the shaft (section in plane of pinion shaft), according to the invention.
Figure 9:
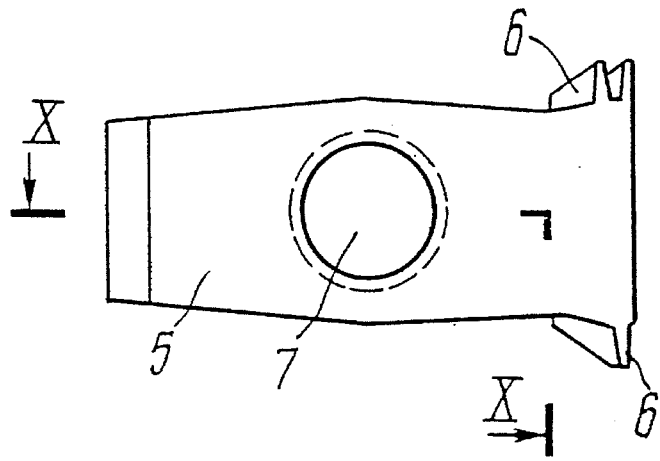
FIG. 9 is the same version of the insert (top view), according to the invention.
Figure 10:
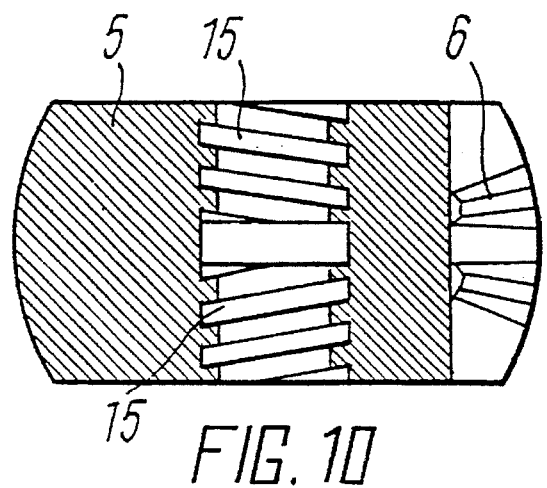
FIG. 10—same as in FIG. 8 (side view, section along X—X), according to the invention.

Another version of the differential lock (FIGS. 7, 8) based on the mechanical operating principle differs from the above-described one in that the axial hole 7 (FIG. 9) of the insert 5 coaxial with the pinion shaft 4 has the form of a cylinder whose internal surface has two-directional threads 15 (FIG. 10) for screwing in two hollow bushings 16, each forming a screw pair with the corresponding thread 15 of the axial hole 7. The shaft 4 functioning simultaneously as the shaft of the pinions 3 is made up of a two-step pin 17 (FIGS. 7, 8) whose smaller-diameter step has two slipped-on hollow bushings 16 and a sleeve 18. The end surfaces of the sleeve 18 and the larger-diameter steps of the pin 17 function as the stops which limit the axial motion of the hollow bushings 16. The axial motion of said bushings may be limited by the end surfaces of the pinions 3.

The mechanical differential lock functions as follows.

Figure 11A:
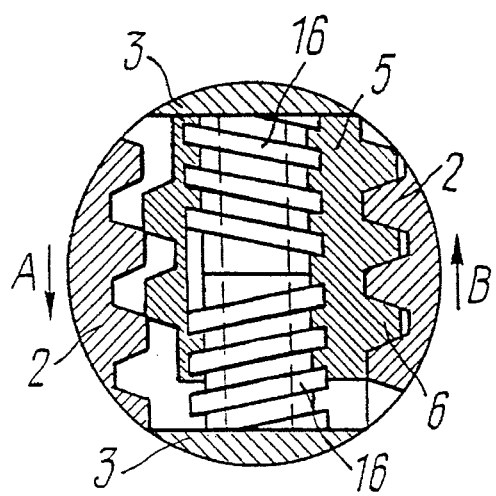
FIG. 11 (a, b, c, d) are schematic views of another embodiment of the insert in its different positions relative to bevel gears (front view), according to the invention.
Figure 11B:
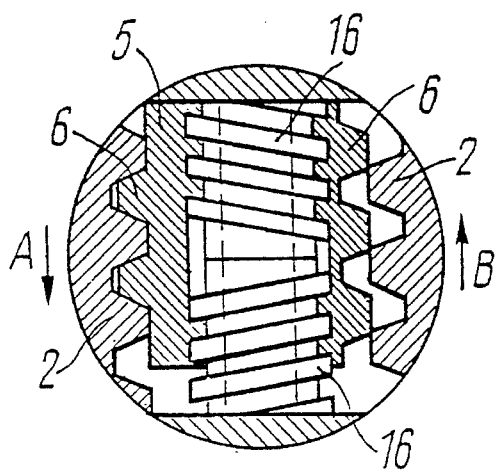
Figure 11C:
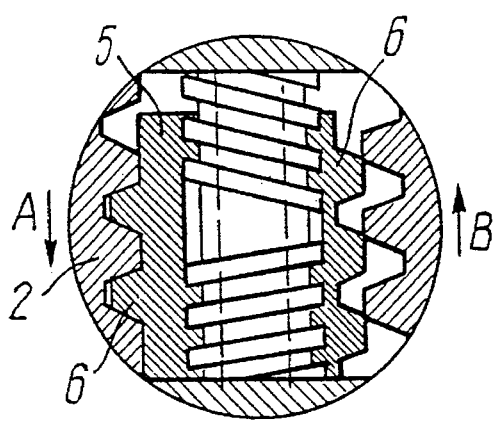
Figure 11D:
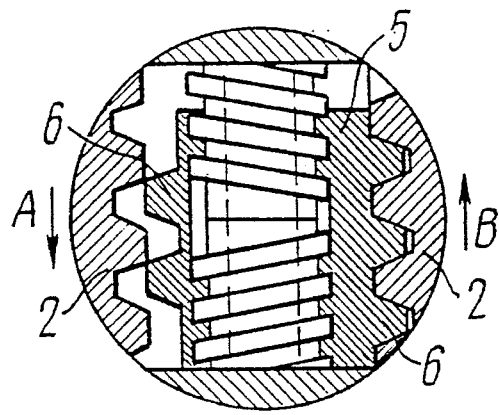

At different angular velocities of the gears 2 (FIGS. 11a, b, c, d) the insert 5 may occupy any position. For example, the insert 5 (FIG. 11a) meshes with one of the gears 2 after linear motion over the shaft 4 towards the circular motion of the teeth of this gear 2 (FIG. 11a, arrow B) to the moment of divergence of the tooth tops on the opposite side. The push-out axial forces of the gearing turn the insert on the shaft 4 together with the hollow bushings 16 and put it in engagement with the counterposed gear 2 which rotates in the opposite direction relative to the first gear 2 (FIG. 11b, arrow A). Thereafter, the insert 5 moving linearly backward over the shaft 4 rotates the threaded bushings 16 inside (FIG. 11c). Owing to the opposite directions of their thread, the bushings 16 rotate in different directions so that the forces tending to turn the insert 5 along rotation of the hollow bushings 16 are equal to zero. The axial forces originated by the interaction of the sides of teeth 6 are unable to demesh the insert 5 since the teeth 6 of its opposite side dwell on the tooth tops of the opposite gear 2. To demesh the insert 5, it must be moved over the shaft 4 so as to bring the teeth 6 of the insert 5 opposite the tooth spaces of this gear 2 (FIG. 11c). After divergence of tooth tops the insert 5 again turns on the shaft 4 together with the hollow bushings 16 and comes in mesh with the opposite gear 2 (FIG. 10d). Thus, the reciprocating insert 5 during rotation of one of the gears 2 at a higher angular velocity, meshes alternately with one gear 2 or the other, rotating the internal threaded bushings 16 and is subjected to the resistance accompanying the conversion of the translational movement into rotary motion which is just the constant internal friction of the differential.

The lock of the bevel gear differential made in the form of an insert disposed between the counterposed bevel gears of said differential and reciprocated by interaction with their teeth marks the advent of a new class of locks for bevel gear differentials.

The above-discussed embodiments of the differential lock are not the only examples of creating resistance to the linear motion of the insert. Other methods, such as compression of springs or elastomers, or the use of PVC paste are also realizable.

Industrial Applicability

The use of the claimed locking device, for example in bevel gear differentials of automobiles enhances the cross country capacity of the vehicle off the roads and its stability on snow- and ice-covered roads by installing it into the bevel gear differential without introducing any changes in the design of the latter. An insert 5 with teeth 6 is installed into the housing 1 of the bevel gear differential on the shaft 4 of the pinions between the bevel gears 2.

As the teeth 6 of the insert 5 engage the teeth of the bevel gears 2, said insert starts reciprocating along the shaft 4. Created by different methods, the resistance to the linear motion of the insert 5 on the shaft limits the relative angular velocity of the gears 2, thereby preventing the one-wheel slipping of the automobile.

The differential lock as an individual assembly can be made for any make of the motor vehicle incorporating a bevel gear differential. Made at a car factory, it can, on Customer's request, be either mounted on the car or be offered for free sale. The characteristics of the already functioning automobile is practically impossible without extensive alterations. However, a simple disassembly of the driving axle in any motor shop and installation of the differential lock opens quite new capabilities to the introduction of the claimed lock into interaxle and interwheel bevel gear differentials enhances the cross country capacities of the automobile and steps up economy.

The claimed interlock can be used in bevel gear differentials of machines and machine tools where the traction forces have to be redistributed while transmitting the rotary motion to the working tools.

The claimed differential lock is noted for a high technical effect when used in mechanical engineering, tractor manufacture, automotive and machine tool industries, etc.

I claim:

1. A differential housing lock for a bevel gear differential comprising:

a housing;

a pair of counter-positioned bevel gears disposed within said housing;

a pinion being disposed between said counter-positioned bevel gears and in contact therewith, causing said bevel gears to interact with each other; and a shaft serving both as a pinion shaft, and as an insert having projections, said projections being tooth shaped, wherein said teeth of the projections are adapted for operational interaction with the teeth of at least one of the counter-positioned bevel gears, so that at different angular velocities of said gears, the teeth of said insert engages the teeth of said bevel gears causing reciprocating motion of said insert in the plane of the shaft axis of said pinion.

2. The differential lock of claim 1, wherein at one end of said insert, the distance (L), being the space from the top of a first projection to the top of a second projection of the insert, corresponds to the distance (H) at the other end of the insert between the top of the teeth of said two counter-positioned gears of the bevel gear differential.

3. The differential lock of claim 1, wherein the insert further includes a hydraulic system having a fluid medium comprising:

a cylindrical hole, coaxial with the pinion shaft;

a throttle ring which divides the hole into two working chambers;

at least one return valve which allows the pinion shaft to communicate with the fluid medium;

said pinion shaft comprising a two step rod, whose smaller diameter step is provided with a slipped on sleeve, said sleeve and the large diameter step of the rod functioning as the pistons of the thus-produced hydraulic system.

4. The differential lock of claim 1, wherein said insert has a cylindrical hole with the internal surface of said hole having two differently oriented threads with each for screwing in a hollow bushing, each bushing having an external thread and making each a screw pair with the corresponding thread of the cylindrical hole, wherein said cylindrical hole is coaxial with said pinion shaft having limited axial motion further comprises a two-step pin whose smaller-diameter step is provided with two slipped-on hollow bushings and a sleeve.

5. The differential lock of claim 4, wherein said hollow bushings have axial motion limiters defined by the end surface of the larger-diameter step of the pin and the end surface of the sleeve.

6. The differential lock of claim 4, wherein said hollow bushings are provided with an axial motion limiter defined by the end surface of the pinion.

* * * * *